3,325,366
BIOLOGICALLY ABSORBABLE FOAM PACKING BANDAGE AND PROCESS THEREFOR
Seymour M. Blaug, Iowa City, and Eugene L. Grandon, Cedar Rapids, Iowa, William M. Henderson, Fargo, N. Dak., and Duane W. Lovett, Thomas W. Slattery, and Frederick D. Staab, Iowa City, Iowa, assignors to the United States of America as represented by the Administrator of Veterans Affairs and/or the Secretary of the Army
No Drawing. Filed Nov. 9, 1964, Ser. No. 410,039
13 Claims. (Cl. 167—82)

This invention relates to foamable therapeutic compositions and more particularly to adsorbable gelatin foams and methods for preparing such foams.

The inventors have discovered that an absorbable gelatin base foam makes an ideal surgical packing for use in treating injuries and in the postoperative treatment of surgical wounds. It has been found that the absorbable gelatin foam of the instant invention can be readily introduced in a sterile condition into body cavities and wounds. When so introduced they act as a surgical packing-bandage, providing support for the body structure adjacent thereto; act as a hemostatic agent preventing bleeding and oozing of the wound and by retaining their consistency and shape fill the area preventing introduction of foreign matter. The absorbable gelatin foams also provide an excellent medium for the introduction of therapeutic agents such as antibiotics, disinfectants, local anesthetics, furans and steroids into the body cavity or wound being treated.

Since the foam is biologically absorbed the packing need not be physically removed from the situs of treatment but may be retained therein throughout the healing process; the foam being gradually absorbed by the body.

The foam may also be applied topically and, although it does not form a continuous film, a permeable, hemostatic barrier is formed.

In view of the above properties, it is readily apparent that the product of the instant invention is particularly valuable and no comparable product is known to the art. However, the production of such an adsorbable gelatin foam is fraught with difficulties due to the properties of absorbable gelatin itself.

In order to produce an aerosol foam by discharge from a pressure container, using procedures and apparatus that are well known in the art, it is necessary that the foamable material and the propellant form an oil in water emulsion. Absorbable gelatin is insoluble in water and thus apparently incapable of being used to produce the foamed material desired. The inventors, however, have discovered a method for solubilizing absorbable gelatin so that it may be used as the aqueous phase of the oil in water emulsion with the propellant. The formation of the aqueous phase is essential since suspensions of gelatin in the propellant do not form foams and clog the valves and actuators of the aerosol bombs.

It is therefore an object of this invention to provide an absorbable gelatin base foam.

It is a further object of this invention to provide a foamable composition capable of producing the desired absorbable gelatin base foam.

It is another object of this invention to provide a method of solubilizing absorbable gelatin.

These and other objects and advantages of this invention will be readily apparent from the following description of this invention.

Absorbable gelatin such as that sold under the trademark "Gelfoam" by Upjohn Lab. Inc. is heat-stable, thereby suitable for autoclaving, is biologically absorbable but is also characterized by its insolubility in water. The inventors, however, have found that a complex of absorbable gelatin with polyvinylpyrrolidone, hereinafter referred to as PVP, is soluble in water. Absorbable gelatin is extremely light and fluffy and this presents difficulties in handling the material. The inventors' processes, however, also solve this problem.

It has been found that compositions containing from .5%–10% by weight of absorbable gelatin solubilized with 10%–70% by weight of polyvinylpyrrolidone, from 0% to 2% of therapeutic agents such as Neomycin sulphate, Polymixin B Sulphate and iodine and the balance water are particularly suitable for use as the aqueous phase of the foam forming emulsion. Such compositions can be produced as follows:

*Example 1*

The desired weight of absorbable gelatin and PVP are thoroughly mixed together in the dry powdered form in a suitable container. The blended solids are then wetted with an organic water miscible solvent having a boiling point below that of water but above approximately 34° C. The solvent must be inert towards both PVP and the absorbable gelatin and suitable solvents include methyl alcohol, ethyl alcohol and acetone. Hot (above 60° C.) or boiling distilled water is then added slowly with stirring and the stirring is continued until the solids are dissolved. The amount of water added at this time is equal to or less than the amount of water required to bring the composition to its desired final concentration. The composition is then heated on a steam bath to drive off the inert solvent and then water is added, if necessary, to bring the solution to its desired concentration.

*Example 2*

A desired amount of absorbable gelatin powder is placed in a suitable container and wetted with an inert solvent as set forth above. To the wetted absorbable gelatin is added, slowly with stirring, a hot (above 60° C.) aqueous solution of PVP. The concentration of the PVP solution can be from 10%–70% by weight PVP with 50% being the preferred concentration. The resulting solution is then heated over a steam bath to drive off the inert solvent and the solution is brought to final concentration by addition of either distilled water or the PVP solution.

The therapeutic agents used can be added to the solutions formed according to either process in the form of aqueous solutions or in the case of iodine as a complex in an aqueous PVP solution. In the above methods the wetting of the absorbable gelatin with the inert solvent decreases its bulk, enhances the physical manipulation thereof and aids in the solubilizing process.

The following compositions are representative of compositions that may be prepared according to the processes of Examples 1 and 2 using acetone as the preferred inert solvent:

TABLE I

| Composition | Percent Absorbable Gelatin | Percent PVP | Therapeutic Agent | Percent | Percent H₂O |
|---|---|---|---|---|---|
| 1 | .5 | 10 | Neomycin SO₄ | 1 | Balance. |
| 2 | .5 | 50 | Polymixin B SO₄ | 0.1 | Do. |
| 3 | .5 | 70 | Iodine | 0.5 | Do. |
| 4 | 1 | 50 | | | Do. |
| 5 | 2 | 50 | Neomycin SO₄ | 1 | Do. |
| 6 | 3 | 50 | Iodine | 0.5 | Do. |
| 7 | 4 | 50 | | | Do. |
| 8 | 5 | 10 | Polymixin B SO₄ | 0.1 | Do. |
| 9 | 5 | 50 | Neomycin SO₄ | 1 | Do. |
| 10 | 5 | 70 | Iodine | .5 | Do. |
| 11 | 6 | 10 | | | Do. |
| 12 | 7 | 70 | Iodine | .5 | Do. |
| 13 | 10 | 50 | Neomycin SO₄ | 1 | Do. |

The effects of varying the composition of the absorbable gelatin and the PVP are, of course, interrelated. Generally, however, increasing the concentration of the PVP increases the solubilization of the absorbable gelatin. However, the higher the concentration of the PVP the greater is the viscosity of the resulting solution and at about 70% PVP the viscosity is as great as can be tolerated. The preferred PVP concentration is about 50%.

As larger amounts of absorbable gelatin are used the consistency of the foam produced from the solution tends to be firmer and more stable. However, the physical bulk of the gelatin makes it impractical to use amounts of gelatin greater than about 10%. Although greater amounts may be used and still produce a satisfactory foam the preferred composition contains approximately 5% absorbable gelatin. The relatively minor amount of therapeutic agents added have no effect on the physical characteristics of the solution or the foams and may be added in amounts necessary for them to produce their desired therapeutic effect.

In order to produce a foam from the solutions set forth above it is necessary to form an oil in water emulsion of the solutions in a suitable propellant composition and then release the emulsion from a pressurized container as is well known in the art. Suitable propellants are chlorofluoroalkanes or blends thereof having vapor pressures at 70° F. of between 25 p.s.i.g.–30 p.s.i.g. Other essential criteria for choosing the propellants, aside from the vapor pressure, are inertness to the formulation and nontoxity to the tissues to be treated. The "Freon" type propellants possess the necessary characteristics and a mixture of 20% by weight of Freon 12, difluorodichloromethane, VP @ 70° F. 84.9 p.s.i.a.) and 80% Freon 114 (tetrafluorodichloroethane, VP @ 70° F. 28.1 p.s.i.a.) produced a propellant with a VP @ 70° F. of 27.2 p.s.i.g.

The propellants can be used in amounts ranging from 5%–50% by volume of the total emulsion. When low concentrations are used the foam tends to be soft, wet and collapsible and when high concentrations are used dry, stiff puffs of foam are ejected from the valve of the pressure vessel in a sputtering fashion. As a result the preferred composition range is from 5%–15% by volume of propellant and this concentration produces a stable, long lasting, easily directed foam.

Since the propellant and the foamable solution must form an oil in water emulsion a surfactant is employed to assist in the emulsification. Any common surfactant can be used, provided, of course, that it is nontoxic in the amounts used and nonreactive with components of the emulsion. Non-ionic polyoxyalkylene derivatives of fat forming fatty acids and non-ionic polyoxyalkylene derivatives of long chain fatty acid partial esters of hexitol anhydrides such as are sold under the trademarks "Myrj" and "Tween" respectively have been found quite suitable.

The procedure for forming the emulsion and charging the pressure vessel is as follows:

*Example 3*

A desired amount of an absorbable gelatin solution produced by either of the processes of Examples 1 and 2 is placed in a suitable container and while still hot between 5% and 20% by weight of surfactant is added. The resulting solution is then placed into a clean aerosol bomb, the valve is crimped on and the unit is autoclaved to sterilize the contents. While still hot between 5% and 50% by volume of propellant is charged under pressure into the aerosol container. A high pressure filter capable of removing all particles larger than 0.44 micron is used in the propellant feed line to remove all bacteria and spores thereby rendering the propellant sterile. The unit is agitated while hot to assist in the emulsification process. Upon cooling the units are ready for use.

Representative examples of compositions that may be prepared are as follows with reference being made to the compositions set forth in Table I:

| Comp. | Aqueous Phase | | Oil Phase | |
|---|---|---|---|---|
| | Percent by Wt. | Surfactant | Percent by Wt. | Propellant | Percent by Vol. |
| 1 | 95 | Tween 20 | 5 | Freon 114 | 5 |
| 2 | 80 | Tween 80 | 20 | Blend of Freon 12 and Freon 114 (80%–20% by est.). | 15 |
| 9 | 95 | Myrj 52 | 5 | do | 5 |
| 9 | 80 | Myrj 53 | 20 | do | 15 |
| 9 | 85 | Tween 20 | 15 | do | 50 |
| 12 | 95 | Tween 80 | 5 | do | 15 |
| 13 | 80 | Myrj 53 | 20 | do | 15 |
| 13 | 95 | Myrj 52 | 5 | do | 5 |

The foams of this invention have been used successfully in dental procedures as well as in the treatment and care of puncture wounds such as stab and gunshot wounds. For example after extraction of a tooth the foam containing a suitable therapeutic agent is introduced directly from the aerosol bomb into the cleaned socket. The foam has sufficient consistency to remain in the socket without the use of sutures although, of course, sutures may be required in certain circumstances. The foam is gradually absorbed by the body and it is not necessary to remove the packing in the course of the healing process. Likewise, a gunshot or stab wound can be cleaned, debrided, filled with the foam, closed with sutures and allowed to heal without further removal of the packing. It should be recognized that the use of the foams of this invention are not limited to these specific uses but may also be introduced into any body cavity or passage, surgical or other wound and may also be applied topically. Further these foams also have wide utility in the field of veterinary medicine.

We claim:
1. A stable foam consisting of an aqueous phase having a gaseous phase dispersed therein; said aqueous phase comprising an aqueous solution of absorbable gelatin solubilized with polyvinylpyrrolidone.
2. A stable foam composition as set forth in claim 1 wherein the aqueous phase contains therapeutic amounts of water-soluble topically effective therapeutic agent.
3. A composition as set forth in claim 2 wherein said topically effective therapeutic agent is selected from the group consisting of Neomycin Sulphate, Polymixin B. Sulphate and Iodine complexed with polyvinylpyrrolidone.
4. A stable foam consisting of an aqueous phase having a gaseous phase dispersed therein said aqueous phase consisting of:
 (a) 0.5%–10% by weight of absorbable gelatin solubilized with from 10%–70% by weight of polyvinylpyrrolidone;
 (b) 5%–20% by weight of an emulsifying agent;
 (c) 0%–2% of a water soluble therapeutic agent; and
 (d) the balance water.
5. The composition of claim 4 wherein the gaseous phase consists of a material selected from the group consisting of chlorofluoroalkanes and mixtures thereof.
6. The composition of claim 5 wherein the gaseous phase material has a vapor pressure at 70° F. of from 25 p.s.i.g.–30 p.s.i.g.
7. The composition of claim 6 wherein the percentage of absorbable gelatin is 5% and the percentage of polyvinylpyrrolidone is 50%.
8. An aqueous solution comprising from .5%–10% by weight of absorbable gelatin and from 10%–70% by weight of polyvinylpyrrolidone.
9. An emulsion consisting of an aqueous phase and an oil phase, said aqueous phase consisting of:
 (a) from 0.5% to 10% by weight of absorbable gelatin solubilized with from 10%–70% by weight of polyvinylpyrrolidone;
 (b) 5%–20% by weight of an emulsifying agent;
 (c) 0%–2% by weight of a water soluble, topically effective therapeutic agent;
 (d) the balance water;
and the oil phase consisting of a material selected from the group consisting of chlorofluorohydrocarbons and mixtures thereof, the oil phase being present in amounts from 5%–50% by volume.
10. The composition of claim 9 wherein the oil phase is present in an amount of from 5%–15% by volume.

11. The composition of claim 10 wherein the oil phase has a vapor pressure at 70° F. of from 25 p.s.i.g. to 30 p.s.i.g.
12. A method of forming an aqueous solution of normally insoluble absorbable gelatin, said solution comprising from 0.5%–10% by weight of absorbable gelatin, from 10%–70% by weight of polyvinylpyrrolidone and from 20%–89.5% by weight water, which comprises the steps of:
 (a) mixing together, in dry powdered form, absorbable gelatin and polyvinylpyrrolidone;
 (b) wetting the mixture with a water miscible organic-solvent having a boiling point below that of water;
 (c) adding hot water in an amount not greater than that required to bring the solution to the final concentration;
 (d) stirring the mixture during the addition of water;
 (e) heating the mixture to drive off the organic solvent; and
 (f) adding sufficient water to bring the mixture to final concentration.
13. A method of forming an aqueous solution of normally insoluble absorbable gelatin, said solution comprising from 0.5%–10% by weight of absorbable gelatin, from 10%–70% by weight of polyvinylpyrrolidone and from 20%–89.5% by weight of water which comprises the steps of:
 (a) wetting the dry powdered absorbable gelatin with a water miscible organic solvent having a boiling point below that of water;
 (b) slowly adding a hot aqueous solution of polyvinylpyrrolidone to the absorbable gelatin in an amount not greater than that required to bring the mixture to final concentration;
 (c) stirring the mixture during the addition of said aqueous solution;
 (d) heating the mixture to drive off said organic solvent; and
 (e) adding aqueous polyvinylpyrrolidone solution in amounts necessary to bring the solution to final concentration.

References Cited

Modern Drug Encyclopedia and Therapeutic Index, 8the ed., 1961, page 525.

ALBERT T. MEYERS, *Primary Examiner.*

SHELDON J. SINGER, *Assistant Examiner.*